A. H. LONG.
PHOTOGRAPHIC CAMERA.
APPLICATION FILED APR. 21, 1920.
1,397,132.
Patented Nov. 15, 1921.
3 SHEETS—SHEET 2.
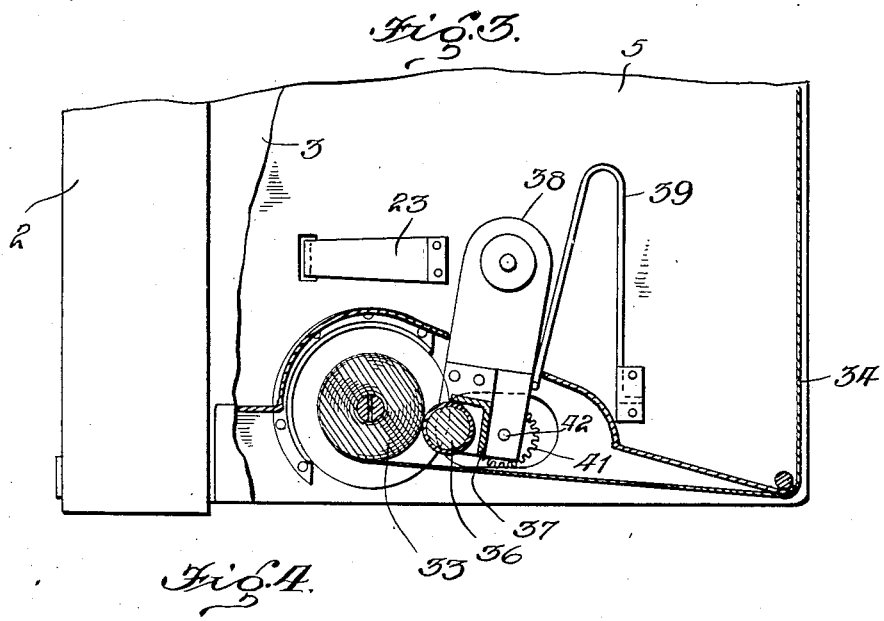
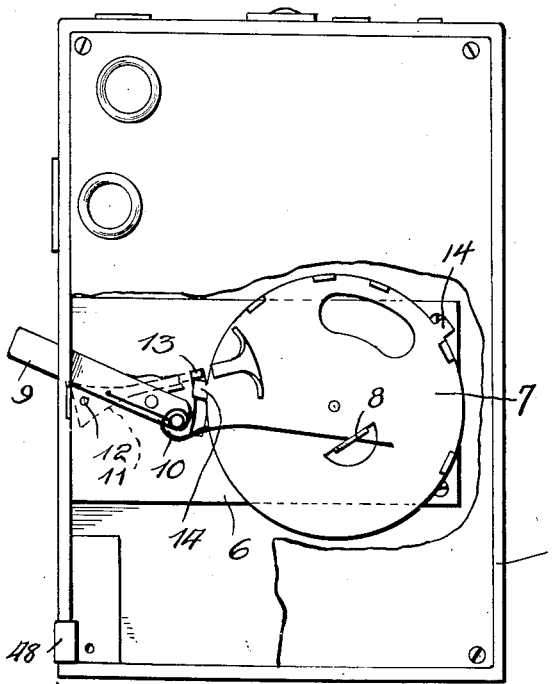
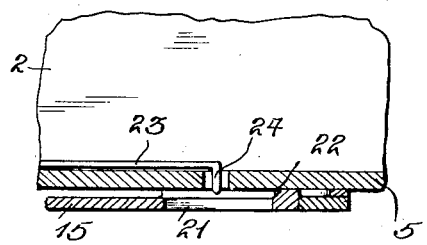
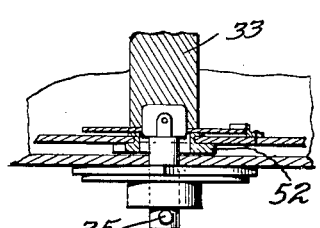
Witnesses
Inventor
Alexander H. Long
By Richard B. Owen,
Attorney

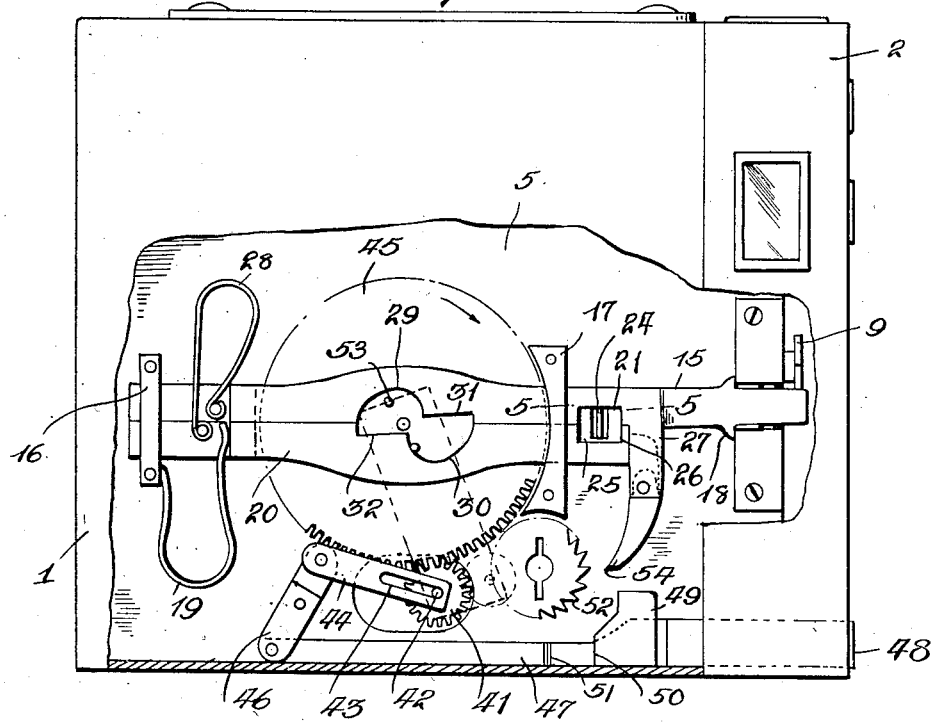

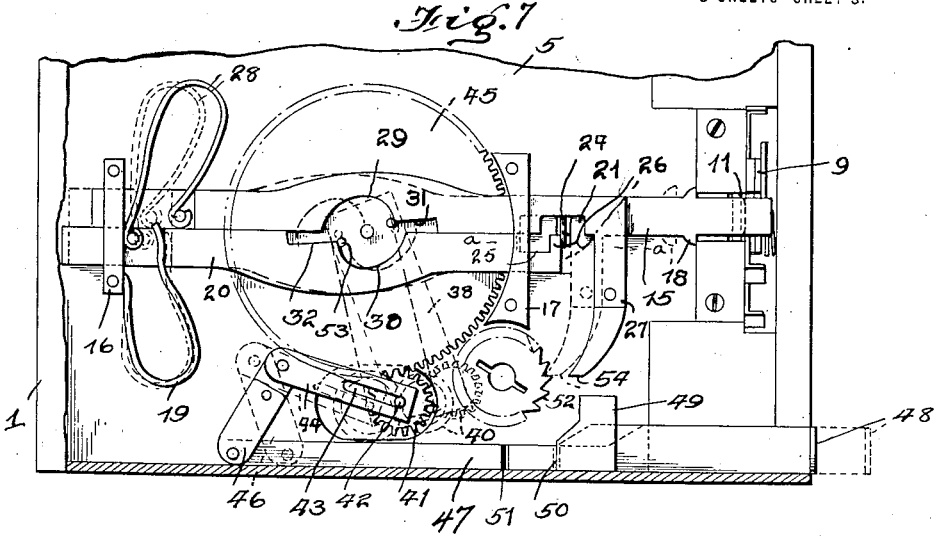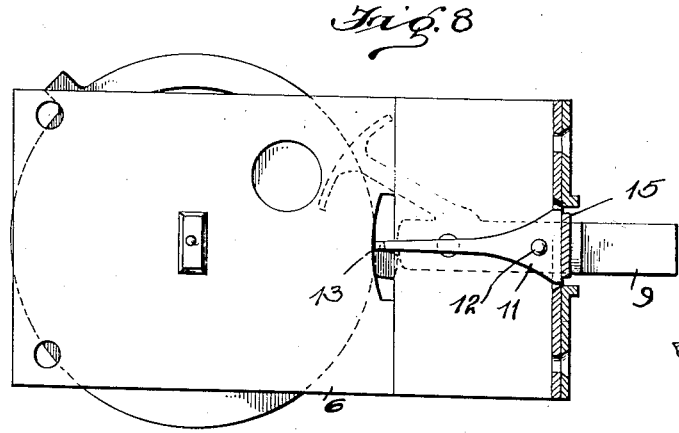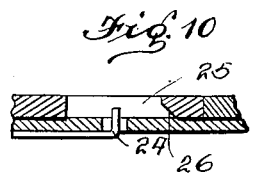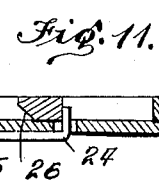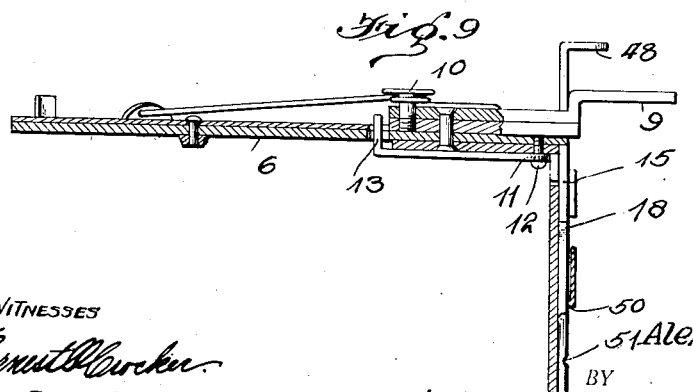

UNITED STATES PATENT OFFICE.

ALEXANDER H. LONG, OF MOBILE, ALABAMA.

PHOTOGRAPHIC CAMERA.

1,397,132.  Specification of Letters Patent.  Patented Nov. 15, 1921.

Application filed April 21, 1920. Serial No. 375,505.

*To all whom it may concern:*

Be it known that I, ALEXANDER H. LONG, a citizen of the United States, residing at Mobile, in the county of Mobile and State of Alabama, have invented certain new and useful Improvements in Photographic Cameras, of which the following is a specification.

The invention relates to photographic cameras and more particularly to film cameras and aims to prevent double exposure and to insure the proper positioning of the film for the next picture.

The invention provides locking means for the shutter mechanism and independent locking means for the film winding mechanism, the two locking mechanisms having a dependance of operation so that only one is effective at a time.

The invention provides novel actuating means for the locking mechanisms adapted to be operated by the film winding mechanism, the shutter locking mechanism being automatically tripped when the shutter mechanism operates and coming into action to prevent further operation of the shutter mechanism until the film has been wound to bring a new portion thereof into proper position to receive the next picture. At this instant the film winding mechanism becomes locked against further movement and the shutter mechanism is released for the taking of the next picture.

The drawings illustrate a preferred embodiment of the invention. However, it is to be understood that in adapting the same to meet different conditions, various changes in the form, proportion and minor details of construction may be resorted to without departing from the nature of the invention as claimed hereinafter.

Referring to the drawings hereto attached:—

Figure 1 is a side view of a box camera having a portion of the case broken away to show more clearly the locking mechanism, and parts associated therewith, Fig. 2 is a view of the frame removed from the case as it appears when seen from the lower or bottom side.

Fig. 3 is a side view of the removable frame having the upper portion broken away and the rear portion of the near wall omitted, thereby exposing the parts attached to the inner side of the remote wall, Fig. 4 is a front view, parts being broken away.

Fig. 5 is a sectional detail on the line 5—5 of Fig. 1 showing the parts on a larger scale.

Fig. 6 is a sectional detail showing the spool and the means for positively rotating the same to wind the film thereon.

Fig. 7 is a view similar to Fig. 1, the upper portion of the frame being broken away, and showing the relationship of the parts after the springs have been tensioned at an instant prior to release of the shutter operating mechanism.

Fig. 8 is a sectional detail of the frame immediately in the rear of the front thereof showing more clearly the shutter operating mechanism.

Fig. 9 is a sectional detail of a portion of the front and side of the removable frame showing the relation of the parts mounted thereon.

Figs. 10, 11 and 12 are detail views showing different positions of the lock bar and spring coöperating therewith.

Corresponding and like parts are referred to in the following description and indicated in the several views of the drawings by like reference characters.

The invention is particularly adapted for cameras utilizing films such as are generally provided in roll form. The invention is shown applied to a photographic camera of box form and embodying a case 1 and a frame removably fitted within the case and comprising a chambered head 2 and a film carrier 3. These parts are of well known construction and arrangement. The removable frame receives the operating parts in a manner well understood. When the frame is properly positioned with reference to the case, the film carrier portion 3 is disposed within the case and the chambered head 2 is exterior to the case and closes the front thereof. The lens, the shutter mechanism and the finding means are mounted upon the chambered head 2 of the removable frame.

The mechanism constituting a part of the present invention is mounted upon a side wall 5 of the film carrier 3 and a laterally extending plate 6 forming a part of the wall 5 is attached thereto. The shutter mechanism comprising the shutter 7, detent 8, shutter lever 9 and shutter spring 10 is mounted upon the plate 6. A trip 11 is disposed upon the rear side of the plate 6 and is pivoted thereto at 12. The inner end of the trip 11 has a lateral extension 13 which projects through a slot in the plate 6 and is adapted to be engaged by projections 14 of the shutter 7. The head of the trip 11 projects an appreciable distance upon opposite sides of the pivot 12 and is disposed so as to engage the projecting end of a lock bar 15, and effect a lateral movement thereof in either pivot movement of the trip 11 whereby to release the lock bar so that it may be projected into operative position to prevent further movement of the shutter mechanism until the film has been wound to bring a new portion into operative position for the next picture.

The lock bar 15 is disposed against the outer side of the wall 5 and is slidably mounted in keepers 16 and 17. The outer or forward end of the lock bar 15 is inwardly deflected so as to engage behind an edge portion of the plate 6 which constitutes a stop to hold the lock bar when moved rearwardly into retracted position so as to clear the shutter lever 9 and admit of operation of the shutter mechanism. When the lock bar 15 is projected into operative position its forward end extends across the path of the shutter lever 9 and prevents operation thereof in either position. A stop 18 projecting from the top and bottom edges of the lock bar, is adapted to engage a laterally extending part of the frame and thereby limit the forward movement of the lock bar when projected. A spring 19 is adapted to hold the lock bar projected or to exert a pressure to urge the lock bar forward when the same is held in retracted position. The spring 19 does not act directly on the lock bar but indirectly through a set bar 20 which is disposed in parallel relation with the lock bar and adjacent thereto, the contiguous edges of the two bars being in contact. A notch 21 is formed in an edge of the lock bar. The forward edge of the notch 21 is beveled as indicated at 22. A spring detent 23 is secured at one end to the inner side of the wall 5 and its free end is bent laterally as indicated at 24 and projects through an opening in the wall 5 and beyond the outer side of such wall to provide a stop. When the lock bar 15 is in retracted position, the beveled edge 22 thereof engages the projecting portion of the stop 24 and presses the same inward out of operative position.

The set bar 20 is slidably mounted in the keepers 16 and 17, and is formed in an edge with a notch 25 similar to the notch 21. The forward edge of the notch 25 is beveled as indicated at 26 and is adapted to ride upon the outer end of the lateral extension 24 of the detent and press the same inwardly. This takes place during the final rearward movement of the set bar. As soon as the forward end of the set bar clears the lateral extension 24 of the detent, the latter springs outwardly and brings the stop portion 24 into the path of the set bar 20 thereby holding it in retracted position. This takes place a moment prior to the release of the lock bar from the setting mechanism and while the spring 19 is under tension. The instant the lock bar is released from the setting mechanism it is moved rearwardly into retracted position and as it reaches the limit of its rearward movement the beveled edge 22 rides upon the stop 24 and presses the same inward thereby releasing the set bar 20. As soon as the lock bar reaches the limit of its rearward movement its forward end engages the rear of the plate 6, thereby holding the lock bar in retracted position. A projection 27 depending from the lower edge of the lock bar engages the forward end of the set bar and prevents forward movement thereof until the lock bar is disengaged from the restraining influence of the plate 6. When this occurs, both bars 15 and 20 move forward in unison. A spring 28 of substantially U-form has its ends positively connected to the respective bars 15 and 20. When the set bar 20 moves rearwardly, the spring 28 is placed under tension and tends to throw the lock bar 15 rearwardly. The rear movement of the set bar 20 also places the spring under tension. The tensioning of the springs 19 and 28 is effected by a setting mechanism which is controlled primarily by the roll winding mechanism. The opposing edges of the bars 15 and 20 are provided with notches 29 and 30, respectively. These notches are approximately of half round form and are disposed, the one in advance of the other when the bars 15 and 20 are in position to move in unison. The bar 15 has a cut away portion 31 forwardly of the notch 29 and in communication with said notch. The bar 20 has a cut away portion 32 rearwardly of the notch 30 and in communication therewith. The cut away portions 31 and 32 are oppositely disposed and provide clearance spaces for elements of the setting mechanism.

The spool or roll upon which the film is adapted to be wound after exposure is indicated at 33. The film is designated by the numeral 34 and is adapted to be trained about the usual guide rollers at the inner rear corners of the film carrier forming a part of the removable frame. The roll 33 is adapted to be supported in the film carrier in a manner well understood and is adapted to be rotated by means of the usual key 35 which is mounted at one side of the case 1 and is movable laterally in a manner well understood so as to be engaged with or disengaged from the spool 33. A pressure roll 36 is yieldably held in contact with the roll 33 so as to rotate therewith. The pressure roll 36 is mounted in a frame 37 which is provided at one end with an arm 38 which is pivoted at its upper end to the wall 5 of the film carrier. A spring 39 normally exerts a pressure on the arm 38 to yieldably press the roller 36 into engagement with the spool 33 on the film wound thereon. A pinion 40 is secured to the journal of the pressure roll 36 adjacent the arm 38 and is in mesh with a pinion 41 mounted on a pin or stud 42 secured in the lower end of the arm 38 and projecting beyond the outer side of the wall 5 and passing through a slot 43 in one end of a link 44. The pinion 41 extends beyond both sides of the wall 5 so as to mesh with the pinion 40 and with the teeth of a gear wheel 45 disposed upon the outer side of the wall 5. The pinion 41 extends through an opening formed in the wall 5, said opening being oblong to admit of the pressure roll 36 moving to accommodate itself to the diameter of the roll 33. The pressure roll 36 is adapted to be drawn away from the film roll 33 to admit of the latter being removed or replaced as required.

The following means are provided to admit of movement of the pressure roll when required. These means include a lever 46 which is pivoted intermediate its ends to the outer side of the wall 5. The upper end of the lever 46 has the link 44 pivoted thereto. A longitudinally disposed bar 47 has its inner end pivotally connected to the lower end of the lever 46. The bar 47 projects beyond the front of the frame and is bent laterally to provide a finger piece 48 for convenience of operating the bar. A keeper 49 on the wall 5 engages the bar 47. The keeper 49 has an inner extension 50 adapted to engage a notch 51 in a side of the bar 47 so as to hold the bar 47 projecting and the pressure roll 36 away from the film roll 33. The projection 50 is adapted to ride into and out of the notch 51. A ratchet wheel 52 is mounted upon the outer side of the wall 5 in line with the key 35 so as to be engaged by the latter when pressed inward to engage the slotted end of the spool. The winding key 35 engages the ratchet wheel 52 to wind the spool 33 so as to cause both to rotate when the key 35 is turned to wind the film 34 on the spool 33. By reason of the train of gearing between the pressure roll 36 and the gear wheel 45, the latter is positively rotated when the spool 33 is turned to wind the film thereon. Rotation of the gear wheel 45 in a clockwise direction effects a setting of the lock mechanisms.

Two pins 53 project laterally from the gear wheel 45 and are diametrically disposed equi-distant from the center of rotation of said gear wheel. The pins 53 are adapted to enter the notches 29 and 30 of the respective bars 15 and 20. When the lock bar 15 is projected across the path of the shutter lever 9, the winding mechanism is free to be operated to effect a turning of the spool 33 so as to wind a portion of the film 34 thereon. During the time that the lock bar is projected, the top pin 53 occupies an intermediate position of the notch 29 and the lower pin 53 is in contact with the rear edge of the notch 30. It is assumed that the pressure roll 36 is in contact with the roll 33 and as the latter is turned by the key 35 to wind the film thereon, the pressure roll 36 is correspondingly rotated and through the train of gearing effects a clockwise rotation of the gear wheel 45 with the result that the lower pin 53 is moved rearwardly and the top pin 53 forwardly. Rotation of the gear wheel 45 causes a rearward movement of the set bar 20 thereby compressing the spring 19 and expanding the spring 28 by separating the ends thereof. Compression of the spring 19 tends to move the bar 20 forwardly and expansion of the spring 28 operates to move the lock bar 15 rearwardly. As the set bar 15 approaches the limit of its rearward movement, the top pin 53 engages the forward edge of the notch 29 and prevents rearward movement of the lock bar. During the final rearward movement of the set bar 20 the beveled edge 26 rides upon the projecting end 24 of the detent 23, and presses the same inward and an instant before the bar 20 reaches the limit of its rearward movement its forward end clears the part 24 which springs out across the path of the bar 20 and holds it in retracted position with both springs 19 and 28 under tension. At this time the gear wheel 45 has reached a point in its rotation which brings the pins 53 at the ends of the edges of the respective notches 29 and 30. As soon as the pins 53 clear the notches and register with the cut away portions 31 and 32 the lock bar 15 being released moves rearward under the influence of the spring 28 whereby its forward end is caused to engage behind the plate 6 and at the same time the beveled edge 22 rides upon the projecting end of the part 24 and presses the same inward and disengages it from the set bar which is now free to move forward under the tension of the spring 19 but which is held retracted by the projection 27 which engages the forward end of the set bar. At this instant a pawl 54 engages the teeth of the ratchet wheel 52 thereby preventing further rotation of the roll 33. It will be understood that the film winding mechanism is now locked but the shutter mechanism is free to be operated. Movement of the shutter lever 9 effects a movement of the shutter mechanism and the latter actuates the trip 11 which in turn releases the lock bar 15 from the restraining influence of the plate 6. The instant the lock bar 15 is released it is shot forward by the action of the spring 19, both bars 15 and 20 moving in unison. This carries the pawl 54 away from the ratchet wheel 52 thereby releasing the film winding mechanism while at the same time locking the shutter mechanism against further operation until the film has been wound the proper distance to bring the next portion in proper position for exposure to take the next picture. When placing the roll 33 in position or removing it from the frame the pressure roll 36 is moved away from the roll by drawing the bar 47 out. This enables the roll 33 to be easily and conveniently manipulated without interference on the part of the pressure roll.

Having thus fully described my invention what I claim as new and desire to secure by Letters Patent, is:—

1. In a photographic camera including a shutter mechanism and a film winding mechanism, a member including portions adapted to alternately lock the shutter mechanism and the winding mechanism, a set member for the lock member, a connecting spring between the lock and set members, a projecting spring adapted to be tensioned by the set member, means for holding the lock member clear of the shutter mechanism, and means adapted to be actuated by the shutter mechanism to effect release of the lock member whereby it is automatically projected into operative position to prevent movement of the shutter mechanism until the winding mechanism is operated to bring a new portion of the film in position for receiving the next picture.

2. In a photographic camera including a shutter mechanism and a film winding mechanism, a lock member, means tending to project the lock member into operative position, restraining means for holding the lock member out of operative position, an element operable with the lock member for engaging the winding mechanism and preventing movement thereof while the lock member is held out of operative position, and trip means adapted to be actuated by the shutter mechanism for effecting release of the lock member which is automatically projected into operative position to secure the shutter mechanism and release the winding mechanism.

3. In a photographic camera including a shutter mechanism and a film winding mechanism, a lock member for the shutter mechanism, means adapted to yieldably urge the lock member forward, restraining means for holding the lock member out of operative position, trip means adapted to be actuated by the shutter mechanism for releasing the lock member, an element movable with the lock member and adapted to secure the winding mechanism, a spring actuated set member, and means operable by the winding mechanism for actuating the set member for tensioning the lock operating means.

4. In a photographic camera including a shutter mechanism and a film winding mechanism, a lock bar for engaging the shutter mechanism, an element movable with the lock bar and adapted to engage the winding mechanism and prevent operation thereof when the lock bar is out of operative position, a set bar in coöperative relation with the lock bar, a connecting spring between the two bars, a spring for projecting the set bar and intermediate connecting means between the winding mechanism and set bar for moving the latter to tension the two springs whereby the lock bar is retracted and when in retracted position is urged forward by the spring coöperating with the set bar.

5. In a photographic camera including a shutter mechanism and a film winding mechanism, a lock bar for the shutter mechanism an element movable with the lock bar into and out of engagement with the winding mechanism, a set bar, a spring connection between the two bars, a projecting spring co-acting with the set bar, means actuated by the winding mechanism for retracting the set bar, a detent for holding the set bar in retracted position, and adapted to be released by the lock bar, restraining means for holding the lock bar retracted, means between the two bars for holding the set bar in retracted position during the time that the lock bar is held in retracted position, and means adapted to be actuated by the shutter mechanism for releasing the lock bar which is automatically moved forward into operative position to secure the shutter mechanism and release the winding mechanism.

6. In a photographic camera including a shutter mechanism and a film winding mechanism, a lock bar for the shutter mechanism, a lock element movable therewith and adapted to lock the winding mechanism, a set bar, a connecting spring between the two bars, a projecting spring for urging the set bar forward, means actuated by the winding mechanism for moving the set bar rearwardly and placing both springs under tension, a detent for holding the set bar retracted, and adapted to be released by the lock bar and trip means actuated by the shutter mechanism to effect a release of the lock bar when in retracted position.

7. In a photographic camera including a shutter mechanism and a film winding mechanism, a lock bar for securing the shutter mechanism, an element movable with the lock bar for securing the winding mechanism, a set bar in coöperative relation with the lock bar, a connecting spring between the two bars, a projecting spring co-acting with the set bar, means actuated by the winding mechanism for moving the set bar rearwardly and adapted to engage and hold the lock bar forwardly and adapted to clear both bars at approximately the same instant, a detent for holding the set bar retracted, and releasable by the lock bar when the latter moves into retracted position, restraining means for holding the lock bar retracted, and trip means adapted to be actuated by the shutter mechanism for releasing the lock bar to permit it and the set bar to move forwardly at the same time.

8. In a photographic camera including a shutter mechanism and a film winding mechanism, a lock member for securing the shutter mechanism, an element movable with the lock member and adapted to engage the winding mechanism, a set bar in coöperative relation with the lock bar, a connecting spring between the two bars and adapted to be tensioned when the set bar is moved rearwardly, a projecting spring adapted to be tensioned by rearward movement of the set bar, a detent for holding the set bar retracted and releasable by the lock bar, means operable by the winding mechanism and adapted to effect rearward movement of the set bar and holding the lock bar forwardly during the tensioning of the springs and releasable from both bars at approximately the same time, restraining means for holding the lock bar when moved rearwardly, and means adapted to be actuated by the shutter mechanism for effecting release of the lock bar.

9. In a photographic camera including a shutter mechanism and a film winding mechanism, coöperating lock members, a rotatable member adapted to co-act with both members, elements projecting laterally from the rotatable member and adapted to engage the said members to effect movement of one of the members and prevent movement of the other member and releasable from both members at approximately the same instant.

10. In a photographic camera including a shutter mechanism and a film winding mechanism, coöperating members each having a half round notch and a cut away portion in communication with the notch, a rotatable member operable by means of the winding mechanism, and means projecting laterally from the rotatable member and in coöperative relation with the notches and cutaway portions of the two members whereby one of the members is moved rearwardly and the other held against rearward movement and releasable from both members to admit of rearward movement of the member previously held in restraint.

11. In a photographic camera of the character specified, a pressure roll, supporting means therefor yieldably mounted, a lever, connecting means between the lever and the pressure supporting means, a manually operable bar having connection with the lever to admit of movement of the pressure roll to clear the film winding roll and means for holding the operating bar in the required adjusted position.

In testimony whereof I affix my signature in presence of two witnesses.

ALEXANDER H. LONG.

Witnesses:
DE WITT LONG,
ANNIE B. LONG.